(12) United States Patent
Sato et al.

(10) Patent No.: US 8,828,566 B2
(45) Date of Patent: Sep. 9, 2014

(54) PERPENDICULAR MAGNETIC RECORDING DISC

(75) Inventors: Tokichiro Sato, Singapore (SG); Takenori Kajiwara, Singapore (SG)

(73) Assignee: WD Media (Singapore) Pte. Ltd., Singapore (SG)

( * ) Notice: Subject to any disclaimer, the term of this patent is extended or adjusted under 35 U.S.C. 154(b) by 211 days.

(21) Appl. No.: 13/112,433

(22) Filed: May 20, 2011

(65) Prior Publication Data

US 2012/0129009 A1 May 24, 2012

(30) Foreign Application Priority Data

May 21, 2010 (JP) ................................ 2010-117826

(51) Int. Cl.
*G11B 5/66* (2006.01)

(52) U.S. Cl.
CPC ........................................ *G11B 5/66* (2013.01)
USPC .......................................... 428/827; 428/848

(58) Field of Classification Search
None
See application file for complete search history.

(56) References Cited

U.S. PATENT DOCUMENTS

| | | | |
|---|---|---|---|
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |

(Continued)

FOREIGN PATENT DOCUMENTS

| | | |
|---|---|---|
| JP | 2001134918 | 5/2001 |
| JP | 2006-309922 | 11/2006 |
| JP | 2010027197 | 2/2010 |

OTHER PUBLICATIONS

Japanese Office Action dated Apr. 1, 2014 for related Japanese Application No. 2010-117826, pp. 3.

*Primary Examiner* — Holly Rickman
*Assistant Examiner* — Linda Chau

(57) ABSTRACT

[Problem] An object is to make a film thinner while keeping the function as an auxiliary recording layer and increase an SNR.
[Solution] A structure of the perpendicular magnetic disk 100 according to the present invention includes, on a base 110, a granular magnetic layer 160 and an auxiliary recording layer 180 disposed above the granular magnetic layer, the granular magnetic layer having a granular structure in which a non-magnetic substance having an oxide as a main component is segregated around magnetic particles having a CoCrPt alloy as a main ingredient growing in a columnar shape to form a grain boundary part, and the auxiliary recording layer having a CoCrPtRu alloy as a main component and further containing, as a accessory component, a metal forming passivity and not being an antiferromagnet.

11 Claims, 4 Drawing Sheets

(56) References Cited

U.S. PATENT DOCUMENTS

| | | |
|---|---|---|
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,367,229 B2 * | 2/2013 | Sasaki ............... 428/829 |

(56) References Cited

U.S. PATENT DOCUMENTS

| | | |
|---|---|---|
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0214585 A1* | 9/2005 | Li et al. .......................... 428/828 |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0209741 A1* | 8/2010 | Sasaki et al. ............... 428/846.8 |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |

\* cited by examiner

*Fig.3*

| | Cr CONTENT (at%) | Al CONTENT (at%) | Cr+0.75*Al (at%) | Ms (emu/cm3) | SN (dB) | Corrosion |
|---|---|---|---|---|---|---|
| EXAMPLE1 | 2 | 1 | 2.75 | 830 | 15.2 | Fail |
| EXAMPLE2 | 3 | 1 | 3.75 | 780 | 15.8 | Pass |
| EXAMPLE3 | 4 | 1 | 4.75 | 720 | 16.4 | Pass |
| EXAMPLE4 | 6 | 1 | 6.75 | 640 | 16.8 | Pass |
| EXAMPLE5 | 8 | 1 | 8.75 | 560 | 16.2 | Pass |
| EXAMPLE6 | 9 | 1 | 9.75 | 520 | 15.7 | Pass |
| EXAMPLE7 | 2 | 2 | 3.5 | 790 | 15.4 | Fail |
| EXAMPLE8 | 3 | 2 | 4.5 | 740 | 16 | Pass |
| EXAMPLE9 | 4 | 2 | 5.5 | 690 | 16.7 | Pass |
| EXAMPLE10 | 6 | 2 | 7.5 | 610 | 16.4 | Pass |
| EXAMPLE11 | 8 | 2 | 9.5 | 540 | 15.8 | Pass |
| EXAMPLE12 | 2 | 3 | 4.25 | 770 | 15.2 | Pass |
| EXAMPLE13 | 3 | 3 | 5.25 | 690 | 16.1 | Pass |
| EXAMPLE14 | 4 | 3 | 6.25 | 660 | 16.4 | Pass |
| EXAMPLE15 | 6 | 3 | 8.25 | 580 | 16.3 | Pass |
| EXAMPLE16 | 8 | 3 | 10.25 | 490 | 15.7 | Pass |
| EXAMPLE17 | 2 | 4 | 5 | 700 | 15.7 | Pass |
| EXAMPLE18 | 3 | 4 | 6 | 640 | 15.5 | Pass |
| EXAMPLE19 | 4 | 4 | 7 | 620 | 15.3 | Pass |
| EXAMPLE20 | 6 | 4 | 9 | 530 | 15.4 | Pass |
| COMPARATIVE EXAMPLE1 | 2 | 0 | 2 | 850 | 15.1 | Fail |
| COMPARATIVE EXAMPLE2 | 3 | 0 | 3 | 810 | 15.5 | Fail |
| COMPARATIVE EXAMPLE3 | 4 | 0 | 4 | 730 | 16.2 | Fail |
| COMPARATIVE EXAMPLE4 | 6 | 0 | 6 | 680 | 16.7 | Fail |
| COMPARATIVE EXAMPLE5 | 8 | 0 | 8 | 600 | 16.4 | Fail |
| COMPARATIVE EXAMPLE6 | 9 | 0 | 9 | 530 | 15.8 | Pass |

PARENT: 80Co-15Pt-5B

| | ADDITIVE | ADDITION AMOUNT [at%] | SATURATION MAGNETIZATION [emu/cm³] |
|---|---|---|---|
| 62Co-15Pt-5B-18Cr | Cr | 18 | 336 |
| 63Co-15Pt-5B-17Cr | Cr | 17 | 364 |
| 62.5Co-15Pt-5B-17.5Cr | Cr | 17.5 | 345 |
| 60Co-15Pt-5B-20Cr | Cr | 20 | 206 |
| 61Co-15Pt-5B-19Cr | Cr | 19 | 274 |
| 63Co-15Pt-5B-17Cr | Cr | 17 | 361 |
| 70Co-15Pt-5B-10Cr | Cr | 10 | 625 |
| 75Co-15Pt-5B-5Cr | Cr | 5 | 890 |
| 80Co-15Pt-5B | — | 0 | 1049 |
| 75Co-15Pt-5B-5AL | AL | 5 | 883 |
| 77Co-15Pt-5B-3AL | AL | 3 | 955 |
| 79Co-15Pt-5B-1AL | AL | 1 | 1024 |
| 80Co-15Pt-5B | — | 0 | 1049 |

PERPENDICULAR MAGNETIC RECORDING DISC

TECHNICAL FIELD

The present invention relates to a perpendicular magnetic disk implemented on an HDD (hard disk drive) of a perpendicular magnetic recording type or the like.

BACKGROUND ART

With an increase in capacity of information processing in recent years, various information recording technologies have been developed. In particular, the surface recording density of an HDD using magnetic recording technology is continuously increasing at an annual rate of approximately 50%. In recent years, an information recording capacity exceeding 320 gigabytes per platter has been desired for a magnetic recording medium with a 2.5-inch diameter for use in an HDD or the like. To fulfill such demands, an information recording density exceeding 500 gigabits per square inch is desired to be achieved.

Important factors for increasing recording density of the perpendicular magnetic disk include, for example, an improvement in TPI (Tracks per Inch) by narrowing the track width, ensuring electromagnetic conversion characteristics, such as a Signal-to-Noise Ratio (SNR) and an overwrite characteristic (OW characteristic) indicating ease of writing of a signal at the time of improving BPI (Bits per Inch), and further ensuring heat fluctuation resistance with recording bits decreased due to the above. Among these, an increase in SNR in a high recording density condition is important.

The granular magnetic layer is effective in increasing the SNR because an oxide phase and a metal phase are separated to form fine particles. For increasing recording density, the particles of the granular magnetic layer are required to be microfabricated. With microfabrication, however, magnetic energy is also decreased, thereby causing a problem of heat fluctuations. On the other hand, to avoid the problem of heat fluctuations, magnetic anisotropy of a medium is required to be increased. With an increase of magnetic anisotropy, a coercive force is also increased, thereby making it difficult to write. That is, there is a demand for improving both of heat fluctuation resistance and the overwrite characteristic.

Patent Document 1 suggests a write auxiliary layer (corresponding to an auxiliary recording layer) formed above or below a main recording layer and in contact with that main recording layer. In Patent Document 1, the main recording layer is a magnetic layer having a granular structure, and the write auxiliary layer is made of a CoCr alloy (for example, CoCrPtB). In Patent Document 1, by providing the write auxiliary layer, the overwrite characteristic and heat fluctuation resistance can both be improved.

PRIOR ART DOCUMENT

Patent Document

Patent Document 1: Japanese Unexamined Patent Application Publication No. 2006-309922

DISCLOSURE OF INVENTION

Problems to be Solved by the Invention

However, while the auxiliary recording layer improves the overwrite characteristic and heat fluctuation resistance, it serves as a noise source because of magnetic continuity in an in-plane direction, and therefore write spread tends to become large. Therefore, as the film thickness of the auxiliary recording layer is thicker, noise is larger, thereby inhibiting an increase in recording density. Moreover, when the film thickness of the auxiliary recording layer is thick, magnetic spacing between a magnetic head and a soft magnetic layer is increased, and the layer supposed to support writing contrarily acts in a direction of inhibiting writing due to the film thickness of its own. Thus, in order to reduce noise and improve the overwrite characteristic, there is a demand for making the auxiliary recording layer thinner.

One way to make the auxiliary recording layer thinner without damaging its magnetic function is increasing saturation magnetization Ms of the material, because strength of magnetic bonding of the magnetic thin film is determined by the product of saturation magnetization and the film thickness (Ms·t).

For example, in an auxiliary recording layer made of a CoCr alloy, it is possible to decrease the content of Cr and suitably increase saturation magnetization Ms can be suitably increased. However, if Cr is simply decreased, anticorrosion properties of the film is decreased, and therefore corrosion troubles tend to occur. As a result, there is a possibility of occurrence of crash troubles of the head.

Moreover, in the auxiliary recording layer, if Ms is simply increased to make the film thinner, there is a problem in which the SNR is extremely decreased. For this reason, conventionally Ms of the auxiliary recording layer has to be set relatively low and the film thickness has to be set relatively thick.

In view of these problems, an object of the present invention is to make a film thinner while keeping the function as an auxiliary recording layer and increase an SNR.

Means for Solving the Problem

To solve the above problem, the inventors first studied prevention of occurrence of corrosion troubles. The inventors thought that if anticorrosion properties of the film can be improved in some way, saturation magnetization Ms can be increased without inviting segregation of corrosion even when the amount of Cr is decreased.

The inventors next studied elimination of a trade-off between saturation magnetization Ms and the SNR. To begin with, the auxiliary recording layer is required to be magnetically continuous in an in-plane direction and have a c axis oriented in a vertical direction. On the other hand, in the granular magnetic layer, a grain boundary having an oxide as a main component is formed around magnetic crystal particles. For this reason, it can be thought that, when a film of the auxiliary recording layer is formed on the granular magnetic layer, disturbance occurs in crystals of the auxiliary recording layer at an initial growth stage, thereby degrading crystallinity. If there is a crystallinity-decreased portion, the amount of increase in noise is larger for the material with higher Ms. Therefore, it can be thought that, conventionally, the SNR is decreased as Ms is increased. Also, in general, crystallinity tends to be improved if the film thickness is increased, and therefore it can be thought that the film thickness is conventionally made thicker in order to compensate for disturbance in crystals at the initial growth stage.

Thus, it is thought that, if crystallinity can be improved even with a thin thickness, noise is not increased even when Ms is increased and the auxiliary recording layer can be made thinner. With further studies, the inventors completed the invention with thoughts that it is possible to make a film thinner while keeping the magnetic function and reliability of the auxiliary recording layer and, by extension, increase the SNR.

That is, to solve the problems above, a typical structure of a perpendicular magnetic disk according to the present invention includes, on a base, a granular magnetic layer and an auxiliary recording layer disposed above the granular magnetic layer, the granular magnetic layer having a granular structure in which a non-magnetic substance having an oxide as a main component is segregated around magnetic particles having a CoCrPt alloy as a main ingredient growing in a columnar shape to form a grain boundary part, and the auxiliary recording layer having a CoCrPtRu alloy as a main component and further containing, as a accessory component, a metal forming passivity and not being an antiferromagnet. Note that the "main component" in the present application refers to a component most contained when the entire composition is expressed as an atomic percent (or a mole percent).

According to the structure above, with the auxiliary recording layer having a CoCrPtRu alloy as a main component, crystallinity of the auxiliary recording layer can be improved. Therefore, a film can be made thinner while keeping the function as the auxiliary recording layer. And, noise occurring from the film auxiliary recording layer can be reduced. Also, as an associated effect, magnetic spacing between the magnetic head and the soft magnetic layer can be reduced. And, with the accessory component forming passivity, an oxide coating with anticorrosion properties occurs on the surface of the auxiliary recording layer. With this, it is possible to improve anticorrosion properties of the auxiliary recording layer and suppress the occurrence of corrosion troubles. Therefore, it is possible to make a film thinner while keeping the function as an auxiliary recording layer and increase an SNR.

The accessory component described above is preferably any one or more elements selected from the group of Al, Ta, Nb, and Ti. Since these elements form the passivity described above and are not antiferromagnets, the accessory component described above can be suitably used.

The accessory component described above is preferably contained equal to or larger than 1 atomic percent and equal to or smaller than 3 atomic percent. If the content of the accessory component is smaller than 1 atomic percent, an improvement in anticorrosion properties cannot be sufficiently achieved. On the other hand, if the content exceeds 3 atomic percent, crystal orientation of the auxiliary recording layer deteriorates to degrade the SNR. Therefore, the range described above is suitable for the content of the accessory component.

The auxiliary recording layer described above preferably has saturation magnetization Ms equal to or larger than 550 emu/cc and equal to or smaller than 750 emu/cc. With this, a thin film thickness capable of decreasing magnetic spacing while keeping the function of the auxiliary recording layer can be obtained.

The auxiliary recording layer described above preferably has a content of Cr equal to or larger than 3 atomic percent and equal to or smaller than 8 atomic percent. With this, saturation magnetization Ms can be suitably increased.

The auxiliary recording layer described above preferably satisfies 4.5 atomic percent≤(a content of Cr+0.75*a content of the accessory component)≤8.75 atomic percent. With the total amount being within this range, saturation magnetization Ms suitable for making the film thinner can be obtained. If the total amount is more than 8.75 atomic percent, Co is decreased to degrade Ms, which is not preferable. Also, if the total amount is smaller than 4.5 atomic percent, Ms is too high to become a noise source, which is not preferable.

Effect of the Invention

According to the present invention, by improving crystallinity with an auxiliary recording layer having a CoCrPtRu alloy as a main component and by improving anticorrosion properties with an accessory component, it is possible to make a film thinner while keeping the function as an auxiliary recording layer and increase an SNR.

BRIEF DESCRIPTION OF DRAWINGS

FIG. 3 A drawing for comparing cases of adding an accessory component to the auxiliary recording layer and cases of not adding an accessory component.

BEST MODES FOR CARRYING OUT THE INVENTION

Figure 1:
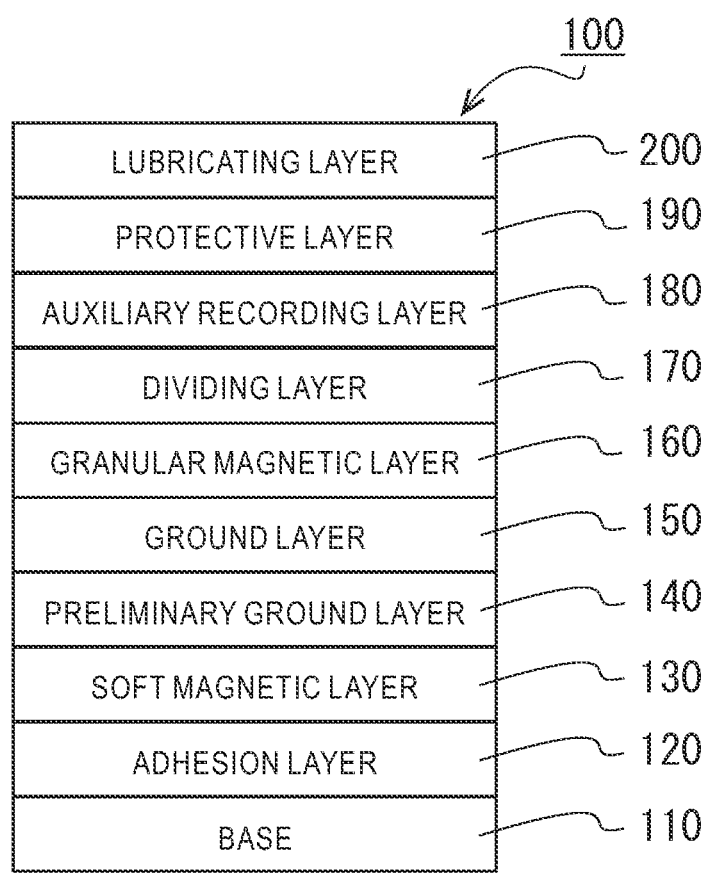
FIG. 1 A diagram for describing the structure of a perpendicular magnetic disk.

In the following, with reference to the attached drawings, preferred embodiments of the present invention are described in detail. The dimensions, materials, and others such as specific numerical values shown in these embodiments are merely examples so as to facilitate understanding of the invention, and are not meant to restrict the present invention unless otherwise specified. Note that, in the specification and drawings, components having substantially the same functions and structures are provided with the same reference character and are not redundantly described, and components not directly relating to the present invention are not shown in the drawings.

(Perpendicular Magnetic Disk)

FIG. 1 is a diagram for describing the structure of a perpendicular magnetic disk 100 according to a first embodiment. The perpendicular magnetic disk 100 depicted in FIG. 1 is configured of a base 110, an adhesion layer 120, a soft magnetic layer 130, a preliminary ground layer 140, a ground layer 150, a granular magnetic layer 160, a dividing layer 170, an auxiliary recording layer 180, a protective layer 190, and a lubricating layer 200.

As the base 110, for example, a glass disk obtained by molding amorphous aluminosilicate glass in a disk shape by direct pressing can be used. Note that the type, size, thickness, and others of the glass disk are not particularly restricted. Examples of a material of the glass disk include, for example, aluminosilicate glass, soda lime glass, soda aluminosilicate glass, aluminoborosilicate glass, borosilicate glass, quartz glass, chain silicate glass, and glass ceramic such as crystallized glass. By sequentially grinding, polishing, and then chemically strengthening any of these glass disks, the flat, the non-magnetic base 110 formed of a chemically-strengthen glass disk can be obtained.

On the base 110, films of the adhesion layer 120 to the auxiliary recording layer 180 are sequentially formed by DC magnetron sputtering, and a film of the protective layer 190 can be formed by CVD. Thereafter, the lubricating layer 200 can be formed by dip coating. The structure of each layer is described below.

The adhesion layer 120 is formed so as to be in contact with the base 110, and has a function of enhancing a close contact strength between the film of the soft magnetic layer 130 formed thereon and the base 110. The adhesion layer 120 is preferably an amorphous alloy film, such as a CrTi-base amorphous alloy, a CoW-base amorphous alloy, a CrW-base amorphous alloy, a CrTa-base amorphous alloy, or a CrNb-base amorphous alloy. The adhesion layer 120 can have a film thickness, for example, on the order of 2 nm to 20 nm. The adhesion layer 120 may be a single layer, and may be formed by laminating a plurality of layers.

The soft magnetic layer 130 functions as helping facilitate writing of a signal in the granular magnetic layer 160 and increase density by convergence of a write magnetic field from the head when a signal is recorded by a perpendicular magnetic recording scheme. As a soft magnetic material, in addition to a cobalt-base alloy such as CoTaZr, a FeCo-base alloy such as FeCoCrB, FeCoTaZr, and FeCoNiTaZr and a material with soft magnetic characteristics such as a NiFe-base alloy can be used. Also, by involving a spacer layer made of Ru approximately in the middle of the soft magnetic layer 130, the structure can be configured so as to have AFC (Antiferro-magnetic exchange coupling). With this, perpendicular components of magnetization can be extremely decreased, and therefore noise occurring from the soft magnetic layer 130 can be reduced. In the case of the structure in which the spacer layer is involved, the film thickness of the soft magnetic layer 130 can be such that the spacer layer has a film thickness on the order of 0.3 nm to 0.9 nm and layers thereabove and therebelow made of a soft magnetic material each have a film thickness on the order of 10 nm to 50 nm.

The preliminary ground layer 140 has a function of promoting crystal orientation of the ground layer 150 formed thereabove and a function of controlling a microfabricated structure, such as a particle diameter. The preliminary ground layer 140 may have a hcp structure, but preferably has a face-centered cubic structure (a fcc structure) in which a (111) surface is parallel to a main surface of the base 110. Examples of the material of the preliminary ground layer 140 can include Ni, Cu, Pt, Pd, Ru, Co, and Hf, and an alloy having any of the above-described metals as a main component and having added thereto one or more of V, Cr, Mo, W, Ta, and others. Specifically, a selection can be suitably made from NiV, NiCr, NiTa, NiW, NiVCr, CuW, CuCr, and others. The preliminary ground layer 140 can have a film thickness on the order of 1 nm to 20 nm. Also, the preliminary ground layer 140 may have a plural-layer structure.

The ground layer 150 is a layer having a hcp structure, having a function of promoting crystal orientation of magnetic crystal particles (hereinafter referred to as magnetic particles) in the hcp structure of the granular magnetic layer 160 formed thereabove and a function of controlling microfabricated structure, such as a particle diameter, and serving as a so-called basis of a granular structure. Ru has a hcp structure as that of Co, and a lattice space of the crystal is similar to that of Co. Therefore, magnetic particles having Co as a main component can be excellently orientated. Therefore, as crystal orientation of the ground layer 150 is higher, crystal orientation of the granular magnetic layer 160 can be improved. Also, by microfabricating the particle diameter of the ground layer 150, the particle diameter of the magnetic particles of the granular magnetic layer 160 can be microfabricated. While Ru is typical as a material of the ground layer 150, furthermore, a metal, such as Cr or Co, or an oxide can be added. The film thickness of the ground layer 150 can be, for example, on the order of 5 to 40 nm.

Also, by changing gas pressure at the time of sputtering, the ground layer 150 may be formed in a two-layer structure. Specifically, when gas pressure of Ar when the upper layer side of the ground layer 150 is formed is higher than that when the lower layer side thereof is formed, the particle diameter of the magnetic particles can be microfabricated while crystal orientation of the upper granular magnetic layer 160 is excellently maintained.

The granular magnetic layer 160 has a granular structure in a columnar shape in which a non-magnetic substance having an oxide as a main component is segregated around the magnetic particles with ferromagnetic properties having a Co—Pt-base alloy as a main component to form a grain boundary. For example, by forming a film with the use of a target obtained by mixing $SiO_2$, $TiO_2$, or the like in a CoCrPt-base alloy, $SiO_2$ or $TiO_2$, which is a non-magnetic substance, is segregated around the magnetic particles (grains) formed of a CoCrPt-base alloy to form a grain boundary, and a granular structure with the magnetic particles growing in a columnar shape can be formed.

Note that the substances for use in the granular magnetic layer 160 described above is merely an example, and is not restrictive. As a CoCrPt-base alloy, one or more types of B, Ta, Cu, and others may be added to CoCrPt. Also, examples of a non-magnetic substance for forming a grain boundary can include oxides, such as silicon oxide ($SiO_2$), titanium oxide ($TiO_2$), chrome oxide ($Cr_2O_3$), zircon oxide ($ZrO_2$), tantalum oxide ($Ta_2O_5$), cobalt oxide (CoO or $Co_3O_4$). Also, not only one type of oxide but also two or more types of oxide can be combined for use.

The dividing layer 170 is provided between the granular magnetic layer 160 and the auxiliary recording layer 180, and has an action of adjusting the strength of exchange coupling between these layers. With this, the strength of a magnetic interaction acting between the granular magnetic layer 160 and the auxiliary recording layer 180 and between adjacent magnetic particles in the granular magnetic layer 160 can be adjusted. With this, while magnetostatic values, such as a coercive force Hc and an inverted-magnetic-domain nucleation magnetic field Hn, relating to heat fluctuation resistance are kept, recording and reproduction characteristics, such as an overwrite characteristic and an SNR characteristic, can be improved.

The dividing layer 170 is preferably a layer having a hcp crystal structure and having Ru or Co as a main component so as not to decrease inheritance of crystal orientation. As a Ru-base material, in addition to Ru, a material obtained by adding another metal, oxygen, or an oxide to Ru can be used. Also, as a Co-base material, a CoCr alloy or the like can be used. Specific examples include Ru, RuCr, RuCo, Ru—$SiO_2$, Ru—$WO_3$, Ru—$TiO_2$, CoCr, CoCr—$SiO_2$, CoCr—$TiO_2$, or the like can be used. Note that a non-magnetic material is normally used for the dividing layer 170, but the dividing layer 170 may have low magnetic properties. Furthermore, in order to obtain excellent exchange coupling strength, the dividing layer 170 may preferably have a film thickness within 0.2 nm to 1.0 nm.

Still further, the dividing layer 170 has an action to the structure to promote separation of the crystal particles of the upper auxiliary recording layer 180. For example, even when the upper layer is made of a material not containing a non-magnetic substance, such as an oxide, the grain boundary of the magnetic crystal particles can be clarified.

Note that while the structure in the present embodiment is such that the dividing layer 170 is provided between the granular magnetic layer 160 and the auxiliary recording layer 180, this is not meant to be restrictive. Therefore, the structure may be such that a film of the auxiliary recording layer 180 is formed directly above the granular magnetic layer 160 without provision of the dividing layer 170.

The auxiliary recording layer 180 is a magnetic layer magnetically approximately continuous in an in-plane direction of a main surface of the base. Since the auxiliary recording layer 180 has a magnetic interaction (exchange coupling) with respect to the granular magnetic layer 160, magnetostatic characteristics, such as a coercive force Hc and an inverted-magnetic-domain nucleation magnetic field Hn, can be adjusted. With this, an object is to improve heat fluctuation resistance, an OW characteristic, and an SNR.

Note that "magnetically continuous" means that magnetic properties continue without interruption. "Approximately continuous" means that the auxiliary recording layer 180 is not necessarily a single magnet when observed as a whole but the magnetic properties may be partially discontinuous. That is, the auxiliary recording layer 180 can have continuous magnetic properties across (so as to cover) a collective body of a plurality of magnetic particles. As long as this condition is satisfied, the auxiliary recording layer 180 may have a structure in which, for example, Cr is segregated.

As the material of the auxiliary recording layer 180, a CoCrPtRu alloy is used as a main component. As such, by having Ru contained, crystallinity of the auxiliary recording layer 180 can be improved. And, with crystallinity of the auxiliary recording layer 180 being improved, even on the grain boundary (an oxide) of the granular magnetic layer 160, disturbance of crystals of the auxiliary recording layer 180 in an initial growth stage can be reduced. Therefore, even when Ms is increased, increasing noise can be suppressed, and also the film thickness can be made thinner.

Also, the content of the auxiliary recording layer 180 is preferably equal to or larger than 3 atomic percent and equal to or smaller than 8 atomic percent. Specifically, with the content of Cr being within this range, optimum saturation magnetization Ms can be obtained.

Note that an additive, such as B, Ta, or Cu, may be added to the CoCrPtRu alloy as a main component. Specifically, the auxiliary recording layer 180 can be made of CoCrPtRuB, CoCrPtRuTa, CoCrPtRuCu, or CoCrPtRuCuB.

Furthermore, as a characteristic element of the present embodiment, the auxiliary recording layer 180 contains a metal forming passivity and not being an antiferromagnet as an accessory component. With this accessory component forming passivity, an oxide coating with anticorrosion properties occurs on the surface of the auxiliary recording layer 180. Therefore, it is possible to improve anticorrosion properties of the auxiliary recording layer 180 and suppress the occurrence of corrosion troubles. As a result, it is possible to make a film thinner while keeping the function as the auxiliary recording layer 180 and increase an SNR.

As the accessory component described above, any one or more elements selected from the group of Al, Ta, Nb, and Ti can be suitably used. Note that the content of the accessory component is preferably equal to or larger than 1 atomic percent and equal to or smaller than 3 atomic percent. If the content of the accessory component is smaller than 1 atomic percent, an improvement in anticorrosion properties cannot be sufficiently achieved. On the other hand, if the content exceeds 3 atomic percent, crystal orientation of the auxiliary recording layer 180 deteriorates to increase noise, thereby degrading the SNR.

Furthermore, 4.5 atomic percent≤(a content of Cr+0.75*a content of the accessory component)≤8.75 atomic percent is preferably satisfied. With the total amount being within this range, saturation magnetization Ms suitable for making the film thinner can be obtained. Here, when the accessory component is added, a decrease in Ms 0.75 times larger than that of Cr is observed. Therefore, in consideration of the total amount of Cr and the accessory component, the content is set as the content of Cr+0.75*the content of the accessory component, the amount can be collectively considered. And if the total amount is larger than 8.75 atomic percent, Co is decreased to degrade Ms, which is not preferable. Also, if the total amount is smaller than 4.5 atomic percent, Ms is too high to become a noise source, which is not preferable.

The auxiliary recording layer 180 preferably has saturation magnetization Ms equal to or larger than 550 emu/cc and equal to or smaller than 750 emu/cc. With this, a thin film thickness capable of decreasing magnetic spacing while keeping the function of the auxiliary recording layer 180 can be obtained. For example, when the strength of the granular magnetic layer 160 determined by the product of saturation magnetization and film thickness (Ms·t) is set as 825 to 3000 emu·nm/cc, with saturation magnetization Ms being set in a range of 550 emu/cc to 750 emu/cc as described above, the film thickness of the auxiliary recording layer 180 can be made thinner to a range of 1.5 nm to 4.0 nm.

As described above, with the auxiliary recording layer 180 being formed as a thin film on the order of 1.5 nm to 4.0 nm, noise occurring from the auxiliary recording layer 180 can be reduced, and also magnetic spacing between the magnetic head and the soft magnetic layer can be reduced. Note that if the film thickness is smaller than 1.5 nm, the SNR is decreased. The reason for this can be thought such that the influence of disturbance of crystallinity at the initial growth stage is increased even with the auxiliary recording layer 180 being formed of the material described above. Also, if the film thickness is thicker than 4.0 nm, the effect of reducing magnetic spacing cannot be obtained.

The protective layer 190 is a layer for protecting the perpendicular magnetic disk 100 from a shock from the magnetic head. The protective layer 190 can be formed by forming a film containing carbon by CVD. In general, a carbon film formed by CVD has an improved film hardness compared with a film formed by sputtering, and therefore is suitable because it can more effectively protect the perpendicular magnetic disk 100 from a shock from the magnetic head. The protective layer 190 can have a film thickness of, for example, 2 nm to 6 nm.

The lubricating layer 200 is formed so as to prevent damage on the protective layer 190 when the magnetic head makes contact with the surface of the perpendicular magnetic disk 100. For example, a film can be formed by applying PFPE (perfluoropolyether) by dip coating. The lubricating layer 200 can have a film thickness of, for example, 0.5 nm to 2.0 nm.

EXAMPLES

To confirm effectiveness of the above-structured perpendicular magnetic disk 100, the following examples and comparative examples are used for description.

As an example, on the base 110, by using a vacuumed film forming device, films of the adhesion layer 120 to the auxiliary recording layer 180 were sequentially formed in an Ar atmosphere by DC magnetron sputtering. Note that the Ar gas pressure at the time of film formation is 0.6 Pa unless otherwise specified. For the adhesion layer 120, a film was formed of Cr-50Ti so as to have 10 nm. For the soft magnetic layer 130, films were formed of 92(40Fe-60Co)-3Ta-5Zr so as to interpose a Ru layer of 0.7 nm therebetween and each have 20 nm. As the preliminary ground layer 140, a film was formed of Ni-5W so as to have 8 nm. For the ground layer 150, a film was formed of Ru at 0.6 Pa so as to have 10 nm and then a film was formed of Ru at 5 Pa so as to have 10 nm. For the granular magnetic layer 160, a film was formed of 90(70Co-10Cr-20Pt)-10($Cr_2O_3$) at 3 Pa so as to have 2 nm and then a film was formed thereon of 90(72Co-10Cr-18Pt)-5($SiO_2$)-5($TiO_2$) at 3 Pa so as to have 12 nm. For the dividing layer 170, a film was formed of Ru so as to have 0.3 nm. For the auxiliary recording layer 180, films were manufactured as examples and comparative examples for comparison. For the protective layer 190, a film was formed by using $C_2H_4$ by CVD so as to have 4.0 nm, and then its surface layer was nitrided. The lubricating layer 200 was formed by using PFPE by dip coating so as to have 1.0 nm.

Figure 2:
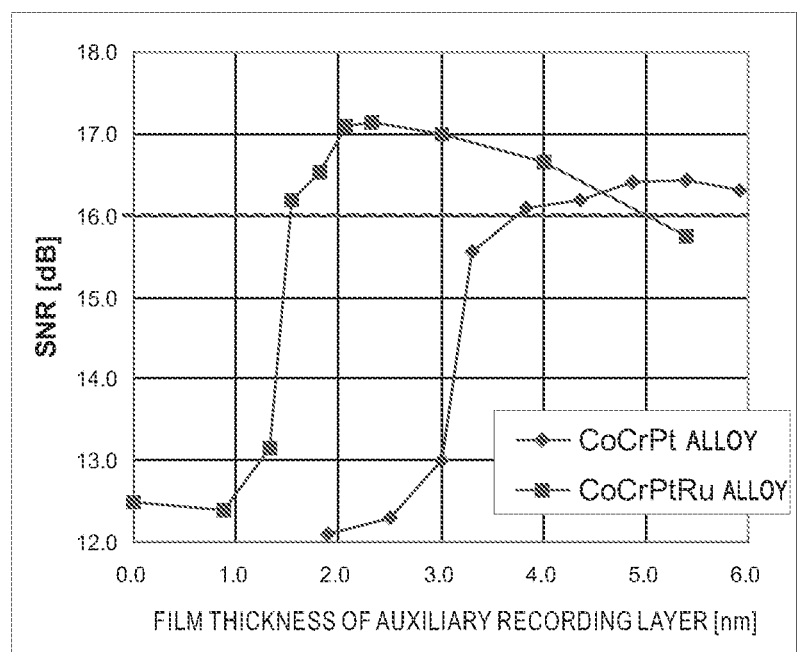
FIG. 2 A drawing for comparing the case of adding Ru to an auxiliary recording layer and the case of not adding Ru.

FIG. 2 is a drawing for comparing the case of adding Ru to the auxiliary recording layer 180 and the case of not adding Ru. As an example of adding Ru, films of a CoCrPtRu alloy (68Co-6Cr-15Pt-6Ru-5B) were formed with varied film thicknesses. As an example of not adding Ru, films of a CoCrPt alloy (62Co-18Cr-15Pt-5B) were formed with varied film thickness.

With reference to FIG. 2, it can be found that the auxiliary recording layer 180 formed of a CoCrPtRu alloy has a high SNR even in a range of thin film thicknesses, compared with a CoCrPt alloy. When observed as a whole, a curve representing behaviors of the SNR hovers at a film thickness approximately 1.5 nm thinner than the other, further increasing the SNR. From this, it can be found that the film of the auxiliary recording layer 180 can be made thinner. More specifically, it can be found that, when a threshold of the SNR required is set as 16.0 dB, a desired SNR can be obtained by setting the film thickness in a range of 1.5 nm to 4.0 nm. From these, it can be found that by using a CoCrPtRu alloy and setting the film thickness in a range of 1.5 nm to 4.0 nm, it is possible to make the film thinner while keeping the function as the auxiliary recording layer and reduce noise occurring from the auxiliary recording layer.

Also, by making the auxiliary recording layer 180 more thinner, as an associated effect, magnetic spacing between the magnetic head and the soft magnetic layer can be reduced.

Note that it can be found that, in a (conventional) CoCrPt alloy, a film thickness on the order of 4 nm is required to obtain a desired SNR. It can also be found that, in a CoCrPtRu alloy, when the film having a thickness of 5 nm is formed, the SNR is decreased instead. The reason for this can be thought such that the product of saturation magnetization and the film thickness of the auxiliary recording layer is too large and the auxiliary recording layer becomes a noise source.

FIG. 3 is a drawing for comparing cases of adding an accessory component to the auxiliary recording layer 180 and cases of not adding an accessory component. FIG. 3(a) is a drawing of compositions and various characteristics of examples and comparative examples. FIG. 3(b) is a drawing of changes of saturation magnetization Ms in the examples and the comparative examples. Note that evaluations in "Corrosion" of FIG. 3 were made in a manner such that the number of spots in corrosion segregated on the main surface of the perpendicular magnetic disk after a lapse of a predetermined period under high temperature and high humidity was counted (a corrosion test), "Pass" means that the test was determined as being passed when the number is smaller than a predetermined value, and "Fail" means that the test was determined as being failed when the number is equal to or larger than the predetermined value.

In the examples, Al is used as an accessory component. In examples 1 to 20, Al as an accessory component is added to the auxiliary recording layer. In detail, the auxiliary recording layer of the example 1 is configured of (66Co-6Cr-16Pt-6Ru-5B—Al), and the content of Cr is increased or decreased in the examples 2 to 6. In the auxiliary recording layers of the examples 7 to 11, Al is 2 atomic percent, and the content of Cr is increased or decreased. In the auxiliary recording layers of the examples 12 to 16, Al is 3 atomic percent, and the content of Cr is increased or decreased. In the auxiliary recording layers of the examples 17 to 20, Al is 4 atomic percent, and the content of Cr is increased or decreased. Note that Co is increased or decreased according to the amount Al or Cr increased or decreased in the composition of each example (the contents of Pt, Ru, B are not changed).

In comparative examples 1 to 6, an accessory component is not added to the auxiliary recording layer. In detail, the auxiliary recording layer of the comparative example 1 is configured of (67Co-6Cr-16Pt-6Ru-5B—Al), and the content of Cr is increased or decreased in the comparative examples 2 to 6. Also in the comparative examples, Co is increased or decreased according to the amount Al or Cr increased or decreased (the contents of Pt, Ru, B are not changed).

First, in comparison between the examples 1 to 20 and the comparative examples 1 to 6 depicted in FIG. 3, in the comparative examples except the comparative example 6, the corrosion test was not passed irrespectively of the content of Cr. However, in the examples except the example 1 and example 7, by adding Al, the occurrence of corrosion can be suppressed. The reason for this can be assumed such that, the added Al forms passivity in the auxiliary recording layer, thereby forming an oxide coating on the surface of the auxiliary recording layer to prevent corrosion. Therefore, it can be understood that, as in the examples, by adding an accessory component, anticorrosion properties of the auxiliary recording layer can be improved.

Note that the examples 1 to 7 were not able to pass the corrosion test. From this, it can be found that when the content of Cr is decreased to 2 atomic percent, anticorrosion properties are decreased to such an extent that addition of Al on the order of 1 atomic percent to 2 atomic percent is not enough to compensate. Therefore, it can be understood that a lower limit value of the content of Cr, which will be described further below, is meaningful not only for saturation magnetization Ms but also corrosion characteristics.

Also, it can be thought that, since the comparative example 6 does not contain Al but contains a large content of Cr, a significant degradation in anticorrosion properties did not occur and the corrosion test was passed. However, since saturation magnetization Ms is extremely low, the film of the auxiliary recording layer 180 cannot be made thinner.

Next, with reference to the examples 17 to 20, when the content of Al is 4 atomic percent, while the corrosion test can be passed, an excellent SNR cannot be achieved. The reason for this can be assumed such that the content of Al is too much and crystal orientation of the auxiliary recording layer is therefore degraded to increase noise. Therefore, it can be understood that the content of Al is preferably equal to or smaller than 3 atomic percent.

Furthermore, the content of Cr in the examples 1 to 16 is now focused. In the examples 1, 7, and 12 where the content of Cr is 2 atomic percent, saturation magnetization Ms is too high. In the example 6 where the content of Cr is 9 atomic percent, saturation magnetization Ms is too low. From this, it can be found that, to ensure an excellent function of the auxiliary recording layer 180, the content of Cr of the auxiliary recording layer 180 is preferably 3 atomic percent to 8 atomic percent or smaller.

Figure 4:
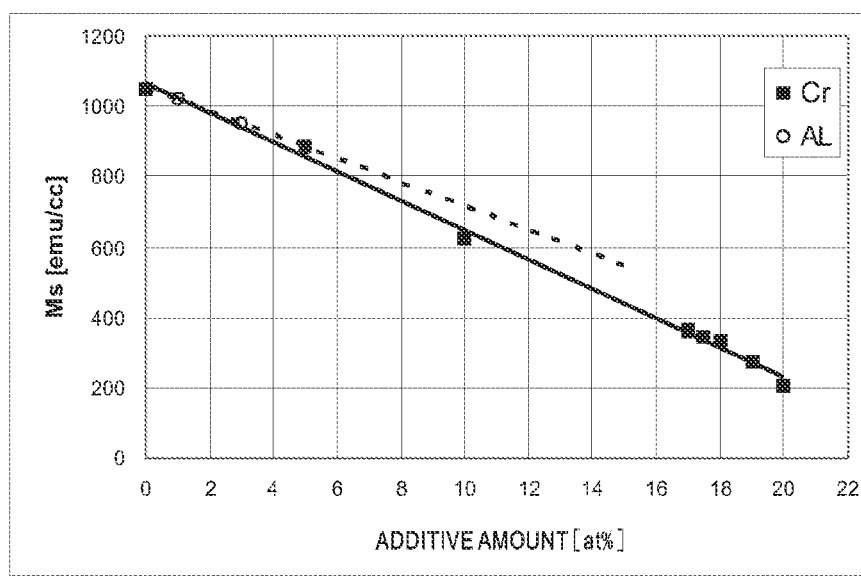
FIG. 4 A drawing that shows changes in saturation magnetization Ms based on contents of Cr and Al.

FIG. 4 is a drawing that shows changes in saturation magnetization Ms based on contents of Cr and Al. In FIG. 4, only Cr or Al as an accessory component is added to a CoPtB alloy for comparing the values of saturation magnetization Ms. As depicted in FIG. 4, as either of Cr and Al is added more, saturation magnetization Ms is decreased. However, according to an experiment, the degree of decreasing Ms by Al is 0.75 times larger than that of Cr. In other words, this means that, when the same degree of Ms is desired to be obtained, Al can be added 1/0.75 times more than Cr.

Thus, when the content of Cr+0.75*the content of Al is focused as a total amount, as depicted in FIG. 3, an excellent SN ratio cannot be obtained in the examples 6, 11, and 16 where the total amount exceeds 8.75 atomic percent. Also, in these examples, saturation magnetization Ms is smaller than 550 emu/cm3. The reason for low saturation magnetization Ms can be thought such that the total amount is large, and it can be thought that, with low saturation magnetization Ms, the overwrite characteristic deteriorates to degrade the SNR.

Also in the examples 1, 2, 7, and 12 where the total amount is smaller than 4.5 atomic percent, the SNR does not reach the threshold. Furthermore, here, the reason for high saturation magnetization Ms can be thought such that the total amount is small, and it can be thought that, with high Ms, noise is increased to degrade the SNR.

As such, in consideration of influences on Ms, by setting the total amount of Cr and Al as the total amount=the content of Cr+0.75*the content of Al and also setting 4.5 atomic percent≤the total amount≤8.75 atomic percent, saturation magnetization Ms suitable for making the film thinner can be obtained. Note that if the total amount is larger than 8.75 atomic percent, Ms is degraded and the film of the auxiliary recording layer 180 cannot be made thinner, which is not preferable. On the other hand, if the total amount is smaller than 4.5 atomic percent, Ms is too high and therefore noise is increased, which is not preferable.

As has been described in the foregoing, according to the perpendicular magnetic disk and its manufacturing method of the present embodiment, a film can be made thinner while keeping the function as the auxiliary recording layer, and noise occurring from the auxiliary recording layer can be reduced. And, with the accessory component forming passivity, an oxide coating with anticorrosion properties occurs on the surface of the auxiliary recording layer. With this, it is possible to improve anticorrosion properties of the auxiliary recording layer and suppress the occurrence of corrosion troubles. Therefore, it is possible to make a film thinner while keeping the function as an auxiliary recording layer and increase an SNR.

In the foregoing, the preferred embodiments of the present invention have been described with reference to the attached drawings. Needless to say, however, the present invention is not restricted to these embodiments. It is clear that the person skilled in the art can conceive various modification examples or corrected examples within a range described in the scope of claims for patent, and it is understood that they reasonably belong to the technological scope of the present invention.

INDUSTRIAL APPLICABILITY

The present invention can be used as a perpendicular magnetic disk implemented on an HDD of a perpendicular magnetic recording type or the like and its manufacturing method.

DESCRIPTION OF REFERENCE NUMERALS

100 . . . perpendicular magnetic disk, 110 . . . base, 120 . . . adhesion layer, 130 . . . soft magnetic layer, 140 . . . preliminary ground layer, 150 . . . ground layer, 160 . . . granular magnetic layer, 170 . . . dividing layer, 180 . . . auxiliary recording layer, 190 . . . protective layer, 200 . . . lubricating layer

The invention claimed is:

1. A perpendicular magnetic disk comprising, on a base, a granular magnetic layer and an auxiliary recording layer disposed above the granular magnetic layer, the granular magnetic layer having a granular structure in which a non-magnetic substance having an oxide as a main component is segregated around magnetic particles having a CoCrPt alloy as a main ingredient growing in a columnar shape to form a grain boundary part, and the auxiliary recording layer having a CoCrPtRu alloy as a main component and further containing, as an accessory component, a metal forming passivity and not being an antiferromagnet, wherein the accessory component is any one or more elements selected from the group of Al and Ti, and a content of the accessory component is equal to or larger than 1 atomic percent and equal to or smaller than 3 atomic percent, and wherein the auxiliary recording layer has a thickness of 1.5 nm to 4.0 nm.

2. The perpendicular magnetic disk according to claim 1, wherein the auxiliary recording layer has saturation magnetization Ms equal to or larger than 550 emu/cc and equal to or smaller than 750 emu/cc.

3. The perpendicular magnetic disk according to claim 1, wherein the auxiliary recording layer has a content of Cr equal to or larger than 3 atomic percent and equal to or smaller than 8 atomic percent.

4. The perpendicular magnetic disk according to claim 1, wherein the auxiliary recording layer having the CoCrPtRu alloy as the main component further comprises an additive selected from the group consisting of B, Ta and Cu.

5. The perpendicular magnetic disk according to claim 1, wherein the CoCrPtRu alloy as the main component of the auxiliary recording layer is CoCrPtRuB.

6. The perpendicular magnetic disk according to claim 1, wherein the accessory component is Al.

7. A perpendicular magnetic disk comprising, on a base, a granular magnetic layer and an auxiliary recording layer disposed above the granular magnetic layer, the granular magnetic layer having a granular structure in which a non-magnetic substance having an oxide as a main component is segregated around magnetic particles having a CoCrPt alloy as a main ingredient growing in a columnar shape to form a grain boundary part, and the auxiliary recording layer having a CoCrPtRu alloy as a main component and further containing, as an accessory component, a metal forming passivity and not being an antiferromagnet, wherein the accessory component is any one or more elements selected from the group of Al and Ti, and wherein the auxiliary recording layer has a thickness of 1.5 nm to 4.0 nm, and the auxiliary recording layer satisfies 4.5 atomic percent≤(a content of Cr+0.75*a content of the accessory component)≤8.75 atomic percent.

8. The perpendicular magnetic disk according to claim 7, wherein the auxiliary recording layer has saturation magnetization Ms equal to or larger than 550 emu/cc and equal to or smaller than 750 emu/cc.

9. The perpendicular magnetic disk according to claim 7, wherein the auxiliary recording layer having the CoCrPtRu alloy as the main component further comprises an additive selected from the group consisting of B, Ta and Cu.

10. The perpendicular magnetic disk according to claim 7, wherein the CoCrPtRu alloy as the main component of the auxiliary recording layer is CoCrPtRuB.

11. The perpendicular magnetic disk according to claim 7, wherein the accessory component is Al.

* * * * *